United States Patent Office 3,419,625
Patented Dec. 31, 1968

3,419,625
FLUOROTRINITROMETHANE
Richard C. Doss, Bartlesville, Okla., assignor to Phillips Petroleum Company, a corporation of Delaware
No Drawing. Filed Feb. 6, 1961, Ser. No. 87,489
16 Claims. (Cl. 260—644)

This invention relates to fluorotrinitromethane as a new compound. In one aspect this invention relates to a method for preparing said fluorotrinitromethane.

According to the invention there is provided a new compound, fluorotrinitromethane, and a process for preparing said new compound. Broadly speaking, said process comprises contacting tetranitromethane with an alkali metal fluoride in the presence of a polar organic solvent.

More specifically, the process of the invention comprises contacting tetranitromethane with an alkali metal fluoride at a temperature within the range of from 0 to 100° C. in the presence of a polar organic solvent. A more preferred temperature range in which said contacting can be carried out is from 10 to 30° C.

As employed herein and in the claims, unless otherwise specified, the term "alkali metal" includes the metals potassium, sodium, lithium, rubidium, and cesium.

Any suitable polar organic solvent which is nonreactive with the reagents being used or the product being prepared, i.e., which is inert under the reaction conditions, is a suitable solvent for use in the practice of the invention. Included among the suitable polar organic solvents are those selected from the group consisting of dimethylformamide, dimethylacetamide, dimethyl sulfoxide, diethyl sulfoxide, and nitriles characterized by the formula R—C≡N wherein R is an alkyl group containing from 1 to 5 carbon atoms. Some specific examples of said nitriles which can be used in the practice of the invention are acetonitrile, propionitrile, isobutyronitrile, and capronitrile.

In the practice of the invention the mol ratio of alkali metal fluoride to tetranitromethane will usually be within the range of from 0.5:1 to 1.5:1, preferably within the range of from 0.75:1 to 1:1.

In the practice of the invention the amount of polar organic solvent which is used will generally be such that it comprises from 50 to 95 weight percent of the reaction mixture.

It is preferred to carry out the reaction under essentially anhydrous conditions. However, small amounts of water can be tolerated with consequent reduction in yield of fluorotrinitromethane.

In one method for carrying out the process of the invention, a given amount of an alkali metal fluoride is dissolved in a given amount of a polar organic solvent to form a solution in a reaction zone. The tetranitromethane is then slowly added to said solution, during which the temperature of said solution is maintained, by any suitable means, within the above mentioned temperature range of 0 to 100° C., preferably within the range of 0 to 30° C. After the addition of the tetranitromethane to said solution has been completed, it is generally desirable to maintain the reaction mixture within one of said temperature ranges for a period of time within the range of about 0.5 to 100 hours, preferably with stirring. If said contacting temperature has been maintained within said preferred range of 0 to 30° C., it is usually desirable to then substantially increase the temperature of the reaction mixture to a temperature of not more than 100° C. for a short period of time, e.g., 5 to 20 minutes. The reaction mixture is then cooled, to about room temperature for example, filtered, and then diluted with from about 1 to 3 volumes of water. The fluorotrinitromethane product of the reaction can be recovered from said diluted filtrate by any suitable process such as distillation, solvent extraction, crystallization, or combinations of said processes. It is to be understood that any suitable method of effecting the contacting of said reagents can be employed in carrying out the invention.

The new compound of the invention, fluorotrinitromethane (fluoronitroform), is useful as an oxidizer in monopropellant compositions in combination with such fuels as lower molecular weight alcohols, lower molecular weight nitriles, lower molecular weight ethers, paraffinic hydrocarbons and cycloparaffinic hydrocarbons containing from 5 to 12 carbon atoms, benzene and substituted benzenes containing from 6 to 12 carbon atoms, etc. Said new compound of the invention is hypergolic with organic polyamines such as N,N,N',N'-tetramethylpropane-1,3-diamine, and can be used in bipropellant systems with such hypergolic fuels.. The use of said new compound of the invention in monopropellant compositions and in bipropellant systems is further disclosed and claimed in copending application Ser. No. 87,488 filed Feb. 6, 1961, now U.S. Patent No. 3,127,736.

The following examples will serve to further illustrate the invention.

EXAMPLE I

A run was carried out in which tetranitromethane was reacted with potassium fluoride in a polar organic solvent.

In this run, 50 ml. of dimethylformamide (DMF) was charged to a 3-necked flask fitted with a thermometer, stirrer, dropping funnel and a condenser. The top of the condenser was connected to a trap. The DMF was cooled to 15° C., and 4.6 grams (0.079 mol) of anhydrous KF was then dissolved in the DMF. At this time, 19.6 grams (0.1 mole) of tetranitromethane (TNM) was added dropwise, the addition requiring approximately 30 minutes. The solution turned bright yellow immediately after the TNM addition was begun, and the solution color turned green before the addition of TNM was completed. The mixture was stirred at a temperature of 15° C. for 45 minutes, and was then heated slowly, while stirring to 98° C. The mixture was then cooled rapidly to 15° C. and filtered, and the filtrate was stored overnight in a refrigerator.

The solution was then diluted with an equal volume of water. The resulting mixture was steam distilled. The organic layer in the overhead was then extracted with ether, and the extract obtained was dried over $MgSO_4$, filtered, and distilled. After the ether had been distilled off, the pot temperature increased to 98° C. and more heat had to be supplied to complete the distillation. One cut, boiling at 80–84° C., amounted to 1.2 grams. This material had a strong odor, a $n_D^{20}=1.3910$, a freezing point of approximately −40° C., and was acid to pH paper.

EXAMPLE II

A mixture containing 9.6 grams of anhydrous KF and 60 ml. of dimethylformamide (DMF) was made up, and cooled to 15° C. in a 100-ml. micro resin flask fitted with a stirrer, thermometer, condenser, and dropping funnel. The system was vented through a Dry Ice-acetone trap. Twenty-eight grams (0.165 mol) of tetranitromethane (TNM) was then slowly added to the stirred solution at a temperature of 12–14° C. over a 40-minute period. The solution turned yellow immediately upon the addition of the TNM, and the solution color gradually turned to green. The mixture was then stirred for 3.5 hours at a temperature of 14° C., after which the temperature was slowly increased to 95° C., and maintained there for 10 minutes. A slight evolution of brown fumes took place. The trap contained 2.2 grams of a blue liquid.

The hot solution was then cooled, filtered, diluted with an equal volume of water, and steam distilled. The distillate was extracted twice with ether, and the combined ether extracts were dried over anhydrous $MgSO_4$. This solution was then filtered and distilled. The cut, 2.2 grams, distilling at 80° C. had a refractive index of $n_D^{20}=1.3891$. This material was combined with the material from Example I and redistilled. The material boiling from 75–79° C. at 738 mm. Hg was then analyzed by nuclear magnetic resonance. Nuclear magnetic resonance indicated the presence of the band for C–F. Infrared analysis showed the presence of —$NO_2$.

EXAMPLE III

In another run, 9.8 grams (0.1686 mol) of freshly prepared anhydrous KF was added to 180 ml. of dimethylformamide (DMF), and the resulting mixture was cooled to 13° C. Thirty grams (0.1775 mol) of tetranitromethane (TNM) was then added over a 5 minute period with stirring. The mixture was then stirred for 3 hours at 12–15° C. and then heated to 70° C. After cooling to room temperature, the mixture was diluted with twice its volume of water and the aqueous solution was extracted with two 100 ml. portions of ether. The ether extracts were dried over $MgSO_4$, filtered and distilled.

DISTILLATION RECORD

| Cut | Head temp., ° C. | Pot temp., ° C. | Wt., grams | R.I. $n_D^{20}$ |
|---|---|---|---|---|
| 1 | 45 | 95 | | |
| 2 | 75 | 115 | 2.0 | |
| 3 | 84 | 145 | 4.5 | |

Cuts 2 and 3 were combined and redistilled to obtain the following:

| 4 | 77 | 85 | 0.2 | 1.3864 |
| 5 | 79 | 86 | 1.0 | 1.3936 |
| 6 | 75 | 100 | 2.5 | 1.3940 |

Cuts 5 and 6 were combined and redistilled to obtain the following:

| 7 | 60–77 | 86 | | |
| 8 | 77–79 | 100 | | |

The density of cut 7 was 1.532 and the density of cut 8 was 1.560. Analysis of cut 8 by gas chromatography showed the material to be 98 percent pure fluorotrinitromethane, with less than 1 percent ether present. Elemental analysis of cut 8 gave the following results.—Calculated for $CN_3O_6F$: carbon, 7.10%; nitrogen, 24.85%; fluorine, 11.23%; oxygen, 56.82%. Found: carbon, 0; nitrogen, 0; fluorine, 10.6%; oxygen, 0.

EXAMPLE IV

Several other runs were made by the procedure of the preceding examples except that minor variations in conditions were employed.

In one run, the procedure of Example II was employed except that a reaction temperature of 5° C. was employed. A 23 percent yield of fluorotrinitromethane (fluoronitroform), having a refractive index of $n_D^{20}=1.3970$ and a freezing point of approximately —40° C., was obtained.

In another run, the procedure of Example III was followed except that the temperature during the TNM addition was 5° C., and the mixture was stirred at 50° C. for 5 hours. The yield of fluorotrinitromethane (fluoronitroform) was 20 percent, $n_D^{20}=1.3945$. This material was hypergolic with N,N,N′N′ - tetramethylpropane - 1,3-diamine.

In three other runs, the addition of TNM was made at 5° C., and the mixture was stirred at 25° C. for 24, 48 and 72 hours, respectively. The respective yields of fluorotrinitromethane (fluoronitroform) were 23 percent, 25.7 percent and 25.8 percent.

EXAMPLE V

Studies were made on the compatibility of fluorotrinitromethane, $FC(NO_2)_3$, with various compounds. These studies were made at or near room temperature by placing 0.2 ml. $FC(NO_2)_3$ in a test tube and adding approximately 0.1 gram of the material to be tested for compatibility.

| Compound tested: | Observed results |
|---|---|
| Acetonitrile | No reaction, miscible. |
| Triptane | Do. |
| Acetone | Do. |
| Methanol | Do. |
| Benzene | Do. |
| Nitrobenzene | Do. |
| Toluene | Do. |
| Pyridine | Reacts, solids form. |
| Sulfolane | No reaction, miscible. |
| Pentene-1 | Do. |
| N-pentane | Do. |
| Cyclohexene | Do. |
| Cyclohexane | Do. |

EXAMPLE VI $FC(NO_2)_3$ was not capable of detonation with a hammer blow.

EXAMPLE VII

It was attempted to prepare fluorotrinitromethane (fluoronitroform) by the reaction of certain fluorine-containing compounds with bromonitroform. Accordingly, bromonitroform was prepared by the reaction of potassium nitroform with bromine in ether. This preparation is by the method of E. Schmidt et al. Ber. 54B, 1483–4 (1921).

The preparation of bromonitroform was carried out in the folowing manner. Eighteen grams (0.095 mole) of potassium nitroform was suspended in 120 ml. ether, and the mixture was cooled to 5° C. while stirring. At this time, 15.2 grams (0.095 mole) of bromine was slowly added to the cooled mixture over about a 30-minute period. After the addition was completed, 50 ml. of water was added to dissolve the KBr that formed. The ether layer was separated and dried over anhydrous magnesium sulfate. The drying agent was then removed, and the filtrate was distilled. Twelve grams of bromonitroform was obtained which distilled at 55–56° C. at 12 mm. mercury absolute pressure. An additional preparation run by the same procedure was carried out, and the bromonitroform products from both of these runs were combined and redistilled. The final product boiled from 55–56° C. at 12 mm. mercury absolute pressure, and had a refractive index $n_D^{20}=1.4782$.

The potassium nitroform used in the above runs was prepared by the reaction of tetranitromethane with KOH in aqueous glycerin. The potassium nitroform was recovered as sharp yellow crystals.

An attempt was made to prepare fluorotrinitromethane (fluoronitroform) by reacting potassium fluoride with bromonitroform, prepared as described above, and to test the progress of the reaction by checking with silver nitrate. According to McBeth et al., Journal of Chemical Society, page 354 (1921), chloronitroform does not react with silver nitrate. Silver fluoride is so very soluble that silver nitrate will not give a precipitate with fluoride ions and thus provide a positive test for said fluoride ions. Thus, in checking the above reaction by testing with silver nitrate, if no precipitate forms, potassium bromide is absent and no reaction occurred; if a precipitate forms, potassium bromide is present and reaction did occur.

Prior to attempting the reaction of potassium fluoride with bromonitroform, the above testing reactions were checked. No reaction was obtained between silver nitrate and bromonitroform. Silimarly, no precipitate was obtained from the reaction of potassium fluoride with silver nitrate. As expected, a large quantity of precipitate was obtained from the reaction of potassium bromide with silver nitrate. The solubility of bromonitroform was checked, and this compound was found to be soluble in acetonitrile, n-pentane, ether, acetone, and benzene.

In the attempted preparation of fluorotrinitromethane (fluoronitroform), 2.3 grams (0.04 mole) of potassium fluoride and 25 ml. of n-pentane were charged to a flask, and 4.6 grams (0.02 mole) of the above-prepared bromonitroform was slowly added at room temperature. No evidence of reaction was detected on testing with silver nitrate.

In another run, 3.4 grams (0.04 mole) of aluminum trifluoride and 25 ml. of acetonitrile were charged to a flask, and 4.6 grams (0.02 mole) of bromonitroform was slowly added at room temperature. No visible reaction occurred at room temperature, and the mixture was then refluxed at 80° C. for 17 hours. The reaction mixture gave a negative silver nitrate test (no precipitate) which indicated no potassium bromide present, thus no reaction had occurred.

In still another run, 3.1 grams (0.05 mole) of NaF·HF, 25 ml. of acetonitrile and 4.6 grams (0.02 mole) of bromonitroform were charged to a flask. No evolution of heat occurred, although the mixture became yellow upon the addition of the bromonitroform. The mixture was refluxed at 80° C., after which the reaction mixture was tested for the presence of sodium bromide by means of silver nitrate. The test was negative, thus no reaction had occurred.

EXAMPLE VIII

Performance characteristics of monopropellant compositions consisting essentially of mixtures of fluorotrinitromethane and various fuel components are presented in Table I below.

TABLE I

| Fuel | Fuel/ oxidizer, wt. ratio | Temperature, ° K. | | Isp max.,[1] lb-sec/lb. | C* ft/sec. |
|---|---|---|---|---|---|
| | | Comb. chamber | Exhaust | | |
| Ammonia | 0.304 | 3,028 | 1,605 | 265 | 5,293 |
| Hydrazine | 0.469 | 3,281 | 1,788 | 281 | 5,603 |
| Triptane | 0.151 | 3,457 | 2,053 | 270 | 5,323 |
| Acetonitrile | 0.262 | 3,508 | 2,027 | 267 | 5,281 |
| Methanol | 0.313 | 3,177 | 1,894 | 261 | 5,134 |

[1] Assuming shifting equilibrium during expansion of combustion gases from 1,000 p.s.i. to 1 atmosphere.

EXAMPLE IX

Performance characteristics of a bipropellant system consisting essentially of N,N,N',N'-tetramethylpropane-1,2-diamine and fluorotrinitromethane are

| Fuel/oxidizer, wt. ratio | Temperature, ° K. | | Isp[1] max., lb-sec./lb. | C* ft./sec. |
|---|---|---|---|---|
| | Comb. chamber | Exhaust | | |
| 0.185 | 3,281 | 1,788 | 271 | 5,335 |

[1] Assuming shifting equilibrium during expansion of combustion gases from 1,000 p.s.i. to 1 atmosphere.

EXAMPLE X

One volume of fluorotrinitromethane was dropped into a vessel containing three volumes of N,N,N',N'-tetramethylpropane-1,2-diamine. Said amine upon being contacted with the fluorotrinitrromethane ignited spontaneously. The test was conducted at room temperature, 70–75° C.

While certain embodiments of the invention have been described for ilustrative purposes, the invention obviously is not limited thereto. Various other modifications will be apparent to those skilled in the art in view of this disclosure. Such modifications are within the spirit and scope of the invention.

I claim:
1. Fluorotrinitromethane.
2. A method of preparing fluorotrinitromethane, which method comprises reacting tetranitromethane with an alkali metal fluoride in the presence of a polar organic solvent for said alkali metal fluoride and which is inert under the reaction conditions, and recovering said fluorotrinitromethane from the resulting reaction mixture.
3. A method according to claim 2 wherein said solvent is selected from the group consisting of dimethylformamide, dimethylacetamide, dimethylpropionamide, dimethyl sulfoxide, diethyl sulfoxide, and nitriles characterized by the formula R—C≡N wherein R is an alkyl group containing from 1 to 5 carbon atoms.
4. A method according to claim 3 wherein said solvent is dimethylformamide.
5. A method according to claim 3 wherein said alkali metal fluoride is potassium fluoride.
6. A method according to claim 4 wherein said alkali metal fluoride is potassium fluoride.
7. A method of preparing fluorotrinitromethane, which method comprises reacting tetranitromethane with an alkali metal fluoride in a reaction zone in a mol ratio of alkali metal fluoride to tetranitromethane within the range of 0.5:1 to 1.5:1, at a temperature within the range of 0 to 100° C., in the presence of a polar organic solvent for said alkali metal fluoride and which is inert under the reaction conditions and which is present in an amount such that it comprises from 50 to 95 weight percent of the resulting reaction mixture, and recovering said fluorotrinitromethane from said resulting reaction mixture.
8. A method according to claim 7 wherein said solvent is selected from the group consisting of dimethylformamide, dimethylacetamide, dimethylpropionamide, dimethyl sulfoxide, diethyl sulfoxide, and nitriles characterized by the formula R—C≡N wherein R is an alkyl group containing from 1 to 5 carbon atoms.
9. A method according to claim 8 wherein said solvent is dimethylformamide.
10. A method according to claim 8 wherein said alkali metal fluoride is potassium fluoride.
11. A method according to claim 9 wherein said alkali metal fluoride is potassium fluoride.
12. A method of preparing fluorotrinitromethane, which method comprises: dissolving a given amount of an alkali metal fluoride in a given amount of a polar organic solvent, which is inert under the reaction conditions described herein, to form a solution in a reaction zone; adding tetranitromethane to said solution at a solution temperature maintained within the range of 0 to 30° C. and in an amount sufficient to give a mol ratio of alkali metal fluoride to tetranitromethane within the range of 0.75:1 to 1:1, said amount of said solvent being sufficient to comprise from 50 to 95 weight percent of the resulting reaction mixture; maintaining said resulting reaction mixture at said temperature with stirring for a period of time within the range of 0.5 to 100 hours, heating said reaction mixture to a temperature of not more than 100° C.; cooling said reaction mixture and filtering same to obtain a filtrate; diluting said filtrate with water; and recovering said fluorotrinitromethane from said diluted filtrate.
13. A method according to claim 12 wherein said solvent is selected from the group consisting of dimethylformamide, dimethylacetamide, dimethylpropionamide, dimethyl sulfoxide, diethyl sulfoxide, and nitriles characterized by the formula R—C≡N wherein R is an alkyl group containing from 1 to 5 carbon atoms.
14. A method according to claim 13 wherein said solvent is dimethylformamide.
15. A method according to claim 13 wherein said alkali metal fluoride is potassium fluoride.
16. A method according to claim 14 wherein said alkali metal fluoride is potassium fluoride.

No references cited

LELAND A. SEBASTIAN, *Primary Examiner.*

U.S. Cl. X.R.

149—36, 88